(12) United States Patent
Ishikawa

(10) Patent No.: US 7,591,241 B2
(45) Date of Patent: Sep. 22, 2009

(54) POWER UNIT

(75) Inventor: Hideo Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 11/978,643

(22) Filed: Oct. 30, 2007

(65) Prior Publication Data

US 2008/0108479 A1    May 8, 2008

(30) Foreign Application Priority Data

Nov. 7, 2006    (JP) .............................. 2006-302043

(51) Int. Cl.
*F02B 75/00*    (2006.01)
*B62D 61/02*    (2006.01)
*B60K 1/02*    (2006.01)

(52) U.S. Cl. ........................... 123/195 R; 123/195 HC; 123/192.2; 180/230; 180/231; 477/44

(58) Field of Classification Search ............. 123/195 R, 123/195 A, 195 HC, 192.2; 180/230, 231; 477/44

See application file for complete search history.

(56) References Cited

FOREIGN PATENT DOCUMENTS

| EP | 1 614 939 A1 | 7/2005 |
|---|---|---|
| EP | 1 840 417 A1 | 3/2007 |
| JP | 2006-46324 A | 2/2006 |

*Primary Examiner*—Noah Kamen
(74) *Attorney, Agent, or Firm*—Birch, Stewart, Kolasch & Birch, LLP

(57) ABSTRACT

To provide a power unit capable of contributing to simplifying the procedure for fitting the electric motor for speed change use and the starter motor to shorten the motor wiring to facilitate the wiring and for concentrating the mass. A power unit includes a unit case which is journaled in a front part to a pivot shaft and a belt-driven continuously variable transmission is provided together with an internal combustion engine. An electric motor for transmission and a starter motor are provided together and supported by the unit case. The electric motor and the transmission are arranged to be adjoining each other on the same side as the pivot shaft in a side view. The electric motor for transmission is arranged in a position closer to the pivot shaft than the starter motor.

16 Claims, 4 Drawing Sheets

POWER UNIT

CROSS-REFERENCE TO RELATED APPLICATIONS

The present application claims priority under 35 USC 119 to Japanese Patent Application No. 2006-302043 filed on Nov. 7, 2006 the entire contents thereof is hereby incorporated by reference.

BACKGROUND OF THE INVENTION

1. Field of the Invention

The present invention relates to a power unit equipped with a belt-driven continuously variable transmission together with an internal combustion engine. More particularly, to a power unit for continuously varying the speed of a belt-driven continuously variable transmission with an electric motor.

2. Description of Background Art

A power unit equipped with a starter motor for starting the internal combustion engine separately from the electric motor for the transmission is disclosed in JP-A No. 2006-46324.

In the power unit disclosed as a mode for implementation in JP-A No. 2006-46324, the left side of a unit case constituting the crankcase of the internal combustion engine extends rearwardly to constitute a transmission case. A shift chamber accommodating a belt-driven continuously variable transmission is formed on the other side, in the right-and-left direction, of the transmission case from the crankcase, shielded by a transmission case cover.

The belt-driven continuously variable transmission achieves a continuous speed variation by moving a movable half pulley of a drive pulley around which a transmission belt that is wound thereby in an axial direction to vary the winding diameter of the transmission belt. An electric motor for speed change use is used for moving this movable half pulley.

Thus, the rotational driving of the electric motor for speed change use is transmitted to the movement of the movable half pulley in the axial direction via a reduction gear mechanism and a screw mechanism.

On the other hand, the starter motor is intended for rotationally driving the crankshaft via the reduction gear mechanism.

Both the starter motor and electric motor for speed change use direct the drive shaft in the widthwise direction of the body, and are arranged substantially horizontally in tandem with a rotational supporting part journaling the power unit on the body in-between in a side view.

With this construction, the starter motor and the electric motor for speed change use cannot be arranged close to each other, necessitating long wiring for either or both with a corresponding increase in cost, reducing the length in which bundled wiring is possible and accordingly resulting in more complex wiring. Further, this construction makes it impossible to integrate the fitting work of the two motors.

Moreover, the separate arrangement of the relatively heavy motors invites dispersion of the mass.

On the other hand, if a small and light-weight electric motor for speed change use is used, the reduction gear mechanism having a plurality of gears will be arranged intervening between the electric motor for speed change use and the drive pulley of the crankshaft with a view to enhance the torque transmitted by the electric motor for speed change use. Thus resulting in an increased distance between the crankshaft and the electric motor.

This means a problem that, if the electric motor for speed change use is arranged behind the starter motor, an interference with the constituent parts of the body (especially the rear wheel) will readily occur. Therefore designing a layout to avoid such interference with constituent parts is made troublesome.

SUMMARY AND OBJECTS OF THE INVENTION

An object of the present invention, attempted in view of this problem, is to provide a power unit which contributes to simplifying the procedure to fit the electric motor for speed change use and the starter motor, shortening the motor wiring to facilitate wiring work and concentrating the mass.

In order to achieve the object stated above, according to an embodiment of the present invention a power unit includes a unit case which is journaled in the front part to a body via a pivot shaft oriented in the widthwise direction of the body and extends rearwardly to be swayable up and down relative to the body. A belt-driven continuously variable transmission, which achieves with an electric motor for transmission continuous speed variation by changing the winding diameter of the transmission belt of a drive pulley is disposed together with an internal combustion engine started with a starter motor. The electric motor for the transmission and the starter motor together are supported by the unit case and are arranged adjoining each other on the same side as the pivot shaft in a side view. The electric motor for the transmission is arranged in a position closer to the pivot shaft than the starter motor.

According to an embodiment of the present invention, a power unit is provided wherein the pivot shaft is positioned in front of the electric motor for the transmission.

According to an embodiment of the present invention, a power unit is provided wherein a throttle body is arranged above the pivot shaft and close to the pivot shaft.

According to an embodiment of the present invention, a power unit is provided wherein the internal combustion engine is provided with a balancer for rotating as the rotation of a crankshaft is transmitted to it via a gear mechanism. A balancer-driven gear rotating the balancer integrally is arranged in a position where it overlaps in a side view a reduction gear mechanism which transmits the motive power of the electric motor for transmission to the drive pulley of the belt-driven continuously variable transmission.

According to an embodiment of the present invention, as the electric motor for speed change use and the starter motor supported together with the unit case are arranged adjoining each other on the same side as the pivot shaft in a side view, motor wiring is shortened with a view to cost reduction. The wiring work is facilitated, and the assembling work on the electric motor for speed change use and the starter motor can also be simplified.

By a concentrated arrangement of such heavy items as the electric motor for speed change use and the starter motor near the pivot shaft, the inertia accompanying the oscillation of the power unit can be reduced and the riding vibration can be alleviated.

Furthermore, as the electric motor for speed change use is arranged in the space between the pivot shaft and the starter motor, even if the spacing between the electric motor for speed change use and the crankshaft is widened, a layout can be realized in which interference with constituent parts of the body, such as the rear wheel, can be easily avoided.

According to an embodiment of the present invention, as the pivot shaft is positioned in front of the electric motor for speed change use, the pivot shaft which is journaled swayably to the front part of the unit case can be journaled farther in front, enabling the vibration-suppressing function of the buffering device to be effectively exerted.

According to an embodiment of the present invention, as the throttle body is arranged above the pivot shaft close to the pivot shaft, the throttle body is arranged in a position where the amplitude of the oscillation of the power unit is relatively small, enabling the throttling action to be accomplished accurately.

According to an embodiment of the present invention, as the balancer-driven gear rotating the balancer integrally is arranged in a position where it overlaps in a side view the reduction gear mechanism which transmits the motive power of the electric motor for transmission to the drive pulley of the belt-driven continuously variable transmission, there is no need to swell out a special unit case for accommodating the balancer and the balancer-driven gear, enabling the power unit to be made more compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One mode for implementing the present invention will be described below with reference to FIGS. 1 through 4.

Figure 1:
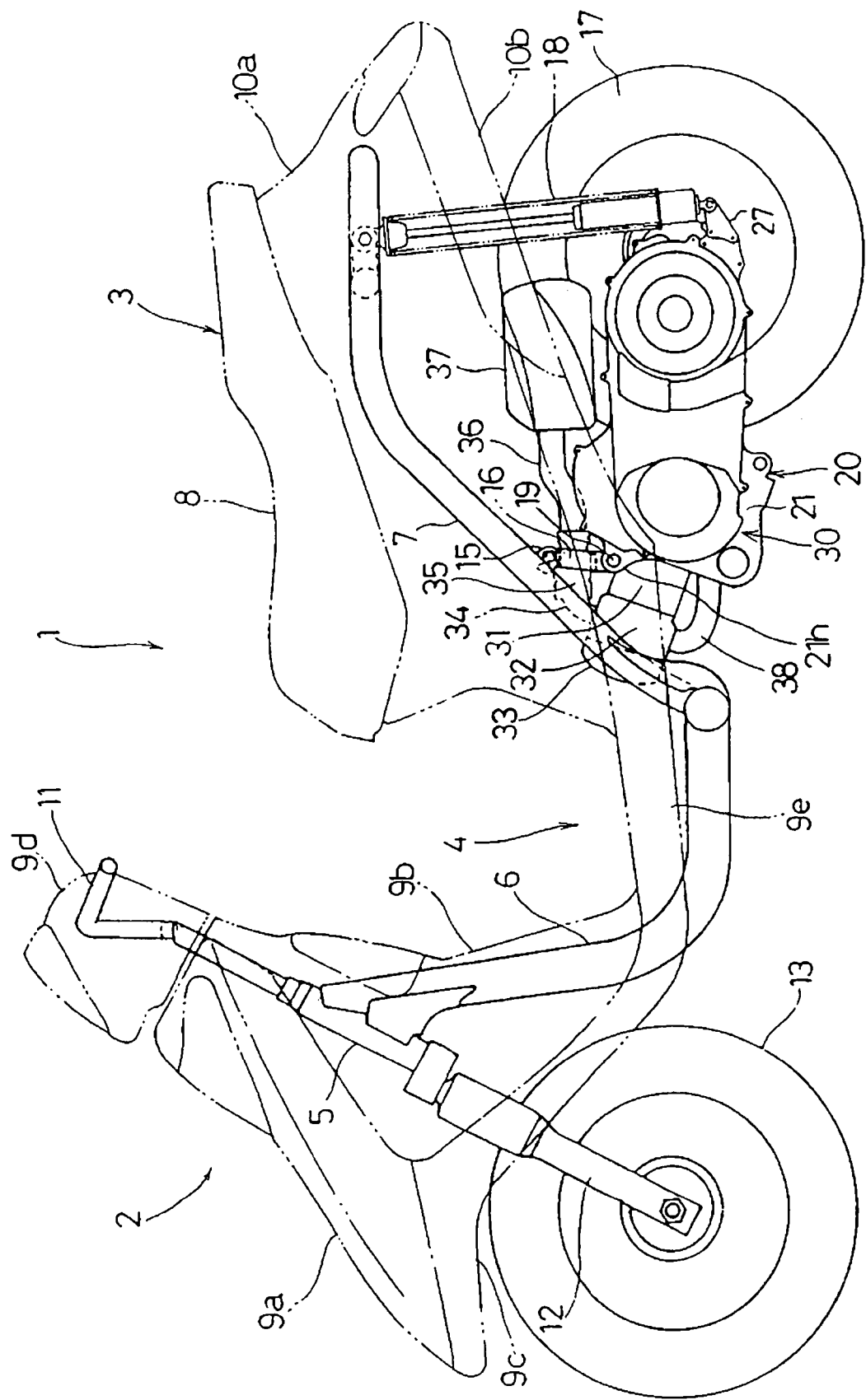
FIG. 1 is an overall profile of a scooter-type motorcycle in one mode for implementation to which the present invention is applied.

FIG. 1 is a profile of a scooter-type motorcycle 1 in one mode for implementation to which the invention is applied.

A front body 2 and a rear body 3 are linked by a low floor part 4, and a body frame constituting the skeleton of the body mainly includes a down tube 6 and main pipes 7.

The down tube 6 extends downwardly from the head pipe 5 of the front body 2; the down tube 6 bends horizontally at its lower end extends rearward below the floor part 4. A pair of main pipes 7, right and left, are linked to its rear end; and the main pipes 7 rise obliquely rearwardly from their liking parts and extends rearwardly, bending horizontally at a prescribed height.

A fuel tank and a chest box are supported by the main pipes 7, and a seat 8 is arranged over them.

On the other hand, over the front body 2, a handlebar 11 is journaled to the head pipe 5, and below the front body 2, a front fork 12 extends and a front wheel 13 is journaled to its lower end.

A bracket 15 projects near the center of the inclined parts of the main pipes 7, and a power unit 20 is swayably linked and supported via a linking member 16 journaled to the bracket 15.

The power unit 20 has an internal combustion engine 30 configured in the front part of a unit case 21. A belt-driven continuously variable transmission 50 is arranged behind the internal combustion engine 30 and a reduction gear mechanism 110 further behind the internal combustion engine 30, wherein the output shaft of the reduction gear mechanism 110 is fitted to a rear wheel 17 by a rear wheel shaft 114 (see FIG. 2).

A pair of right and left power unit hangers 21*h* and 21*h* project forward from the upper part of the front face of the power unit 20 in the front part of the unit case 21. The power unit hangers 21*h* and 21*h* are linked to the lower end of the linking member 16 via a pivot shaft 19, while in the swayable rear part a rear shock absorber 18 intervenes between a bracket 27 at the rear end of the unit case 21 (a transmission case 23) and the main pipes 7 (see FIG. 1).

The internal combustion engine 30, which is a single-cylinder four-stroke cycle internal combustion engine, has a cylinder block 31, a cylinder head 32 and a cylinder head cover 33 stacked one over another and projecting in a significantly inclined forward to a nearly horizontal state from the front face of the unit case 21.

A throttle body 35 is connected to an air intake pipe 34 extending from an air intake port toward the top of the cylinder head 32 and is bent rearwardly. A linking pipe 36 extends rearward from the throttle body 35 and is connected to an air cleaner 37 arranged along the left side of the rear wheel 17 in the rear half of the unit case 21.

The throttle body 35 is positioned near the pivot shaft 19 above the pivot shaft 19 swayably journaled to the unit case 21; therefore the throttle body 35 is arranged in a position wherein the amplitude of the swaying of the power unit 20 is relatively small to enable throttling to be accurately accomplished.

An exhaust pipe 38 extends downwardly from an exhaust port below the cylinder head 32 and bending rearwardly to extend rearwardly leaning toward the right to be connected to a muffler (not shown) on the right side of the rear wheel 17.

The front body 2 is shielded by a front cover 9*a* and a rear cover 9*b* respectively in front and behind and by front lower covers 9*c* on the right and left. In addition, the central part of the handlebar 11 is shielded by a handlebar cover 9*d*.

The floor part 4 is shielded by a side cover 9*e*, and the rear body 3 is shielded respectively on the right and left by a body cover 10*a* and a tail side cover 10*b*.

Figure 2:
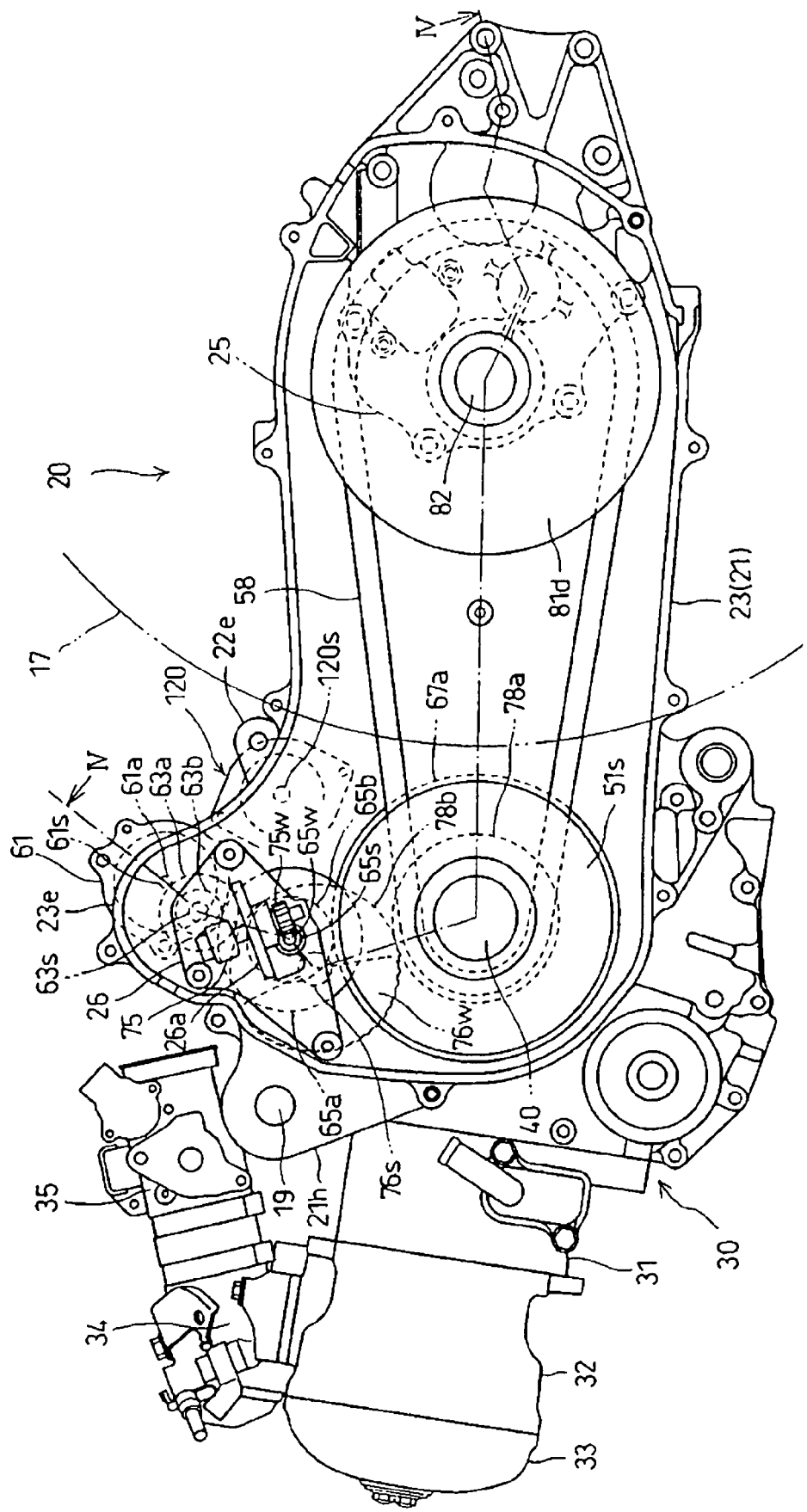
FIG. 2 is a left profile of the power unit.
Figure 3:
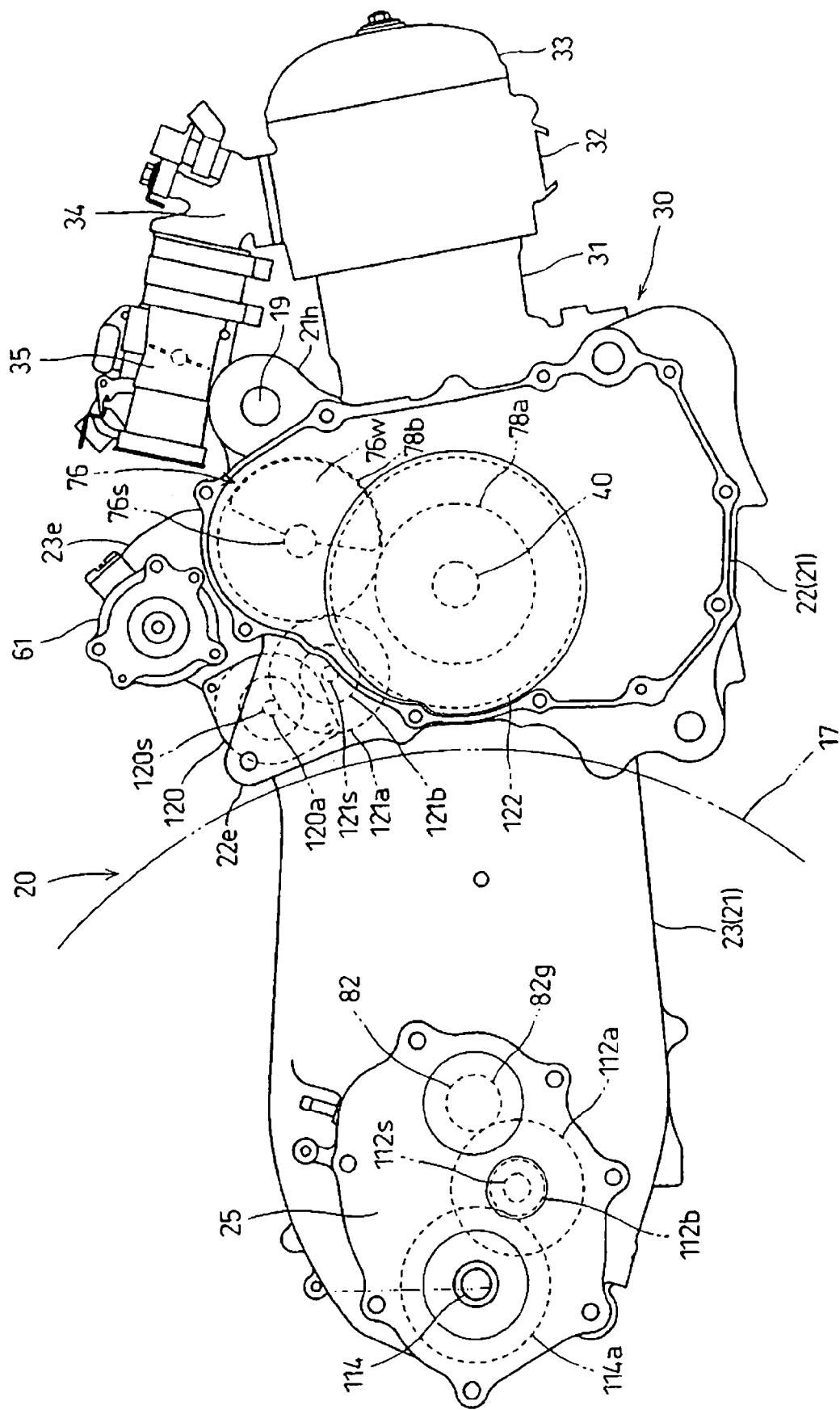
FIG. 3 is a right profile of the power unit.
Figure 4:
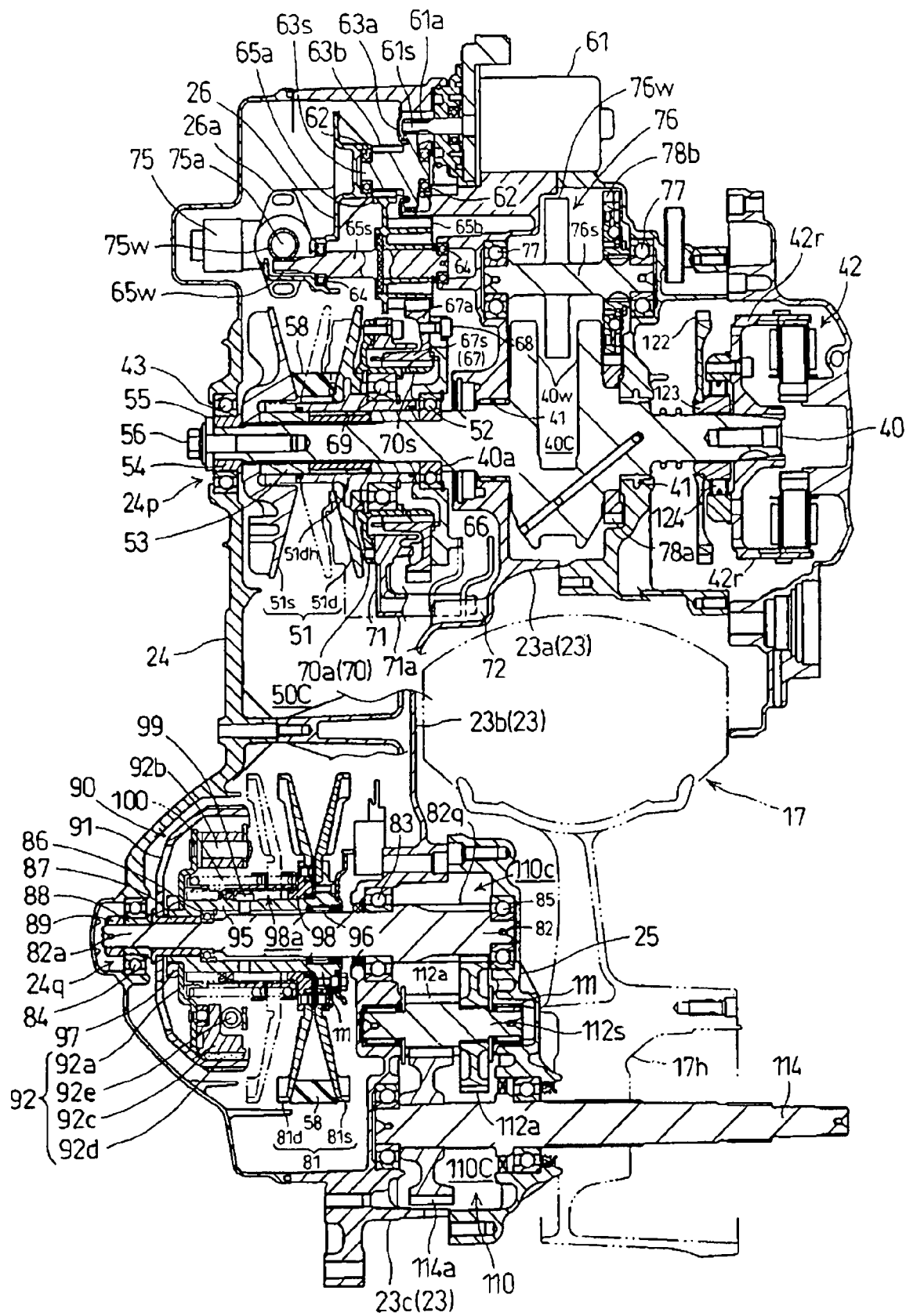
FIG. 4 is a section of the power unit 20 cut and developed substantially along line IV-IV in FIG. 2.

FIG. 2 is a left profile of the power unit 20, FIG. 3, a right profile and FIG. 4, a section of the power unit 20 cut and developed substantially along line IV-IV in FIG. 2.

The unit case 21 is split into right and left parts. The left unit case extends rearwardly relative to the right unit case 22 to constitute the transmission case 23.

The transmission case 23 has a left crankcase part 23*a* formed on the front right side, a transmission case part 23*b* formed on the left side from front to rear and a reduction gear part 23*c* formed on the rear right side. The front left crankcase part 23*a* is combined with the right unit case 22 to constitute a crankcase 40C which accommodates a crankshaft 40. The transmission case part 23*b* is shielded by a transmission case cover 24 from the left side to constitute a shift chamber 50C which is to accommodate the belt-driven continuously variable transmission 50. The reduction gear part 23*c* is shielded by a reduction gear cover 25 to constitute a reduction gear chamber 110C which accommodates the reduction gear mechanism 110.

The crankcase 40C accommodates a pair of right and left crank webs 40w and 40w, with the crankshaft 40 being rotatably supported by right and left bearing round holes of the unit case 21 via main bearings 41 and 41. Out of the extending parts extending right and left in the horizontal direction, the right extending part is provided with an AC generator 42 and the left extending part is provided with a drive pulley 51 of the belt-driven continuously variable transmission 50 together with a speed change drive mechanism 60.

The left end of the crankshaft 40 is journaled to the transmission case cover 24 via a collar 54 and to a bearing round hole 24p via a bearing 43.

The drive pulley 51 has a fixed pulley half 51s and a movable pulley half 51d.

From a step part 40a shrunken in diameter into the smaller diameter of the crankshaft 40 to the left extending part a bearing 52, a guide sleeve 53, the fixed pulley half 51s and the collar 54 are fitted on from right to left in this order. By fastening this assembly to the left end face of the crankshaft 40 with a bolt 56 via a washer 55, the inner ring of the bearing 52, the guide sleeve 53, the base of the fixed pulley half 51s and the collar 54 are tightened and integrated with the crankshaft 40.

Thus, the fixed pulley half 51s, held between the guide sleeve 53 and the collar 54 is integrally fixed to the crankshaft 40 and rotates integrally together with the crankshaft 40.

On the other hand, a cylindrical movable pulley hub 51dh which, being the base of the movable half pulley 51d, opposes the fixed pulley half 51s on the right side, is partly spline-fitted to the guide sleeve 53 to turn together with the crankshaft 40, and at the same time can sway in the axial direction.

The movable half pulley 51d on the right side which opposes the fixed pulley half 51s on the left side turns together with the crankshaft 40 and can approach and move away from the fixed pulley half 51s by sliding in the axial direction. A V-belt 58 is placed and wound between the opposing tapering faces of the two half pulleys 51s, 51d.

Referring to FIGS. 2 and 3, in the transmission case 23, the region behind the power unit hangers 21h in the transmission case part 23b formed to the left of the left crankcase part 23a formed on the front right side significantly swells upwardly. An electric motor 61 for speed change, which is the driving power source of the speed change drive mechanism 60 is fitted to the upper part of this swell 23e from the right side.

Therefore, the electric motor 61 for speed change is arranged above the crankcase 40C formed by the left crankcase part 23a in the front part of the transmission case 23 and a right crankcase 22.

The electric motor 61 for speed change is positioned above by a cylinder block 31 significantly inclined forward (see FIG. 2).

A gear covering member 26 is fitted to part of the swell 23e of the transmission case 23 from the left side.

The two ends of a first reduction gear shaft 63s are journaled between this gear covering member 26 and the wall face of the transmission case 23 via bearings 62 and 62. A large-diameter gear 63a integrated with the first reduction gear shaft 63s engages with a driving gear 61a formed on the drive shaft 61s of the electric motor 61 for speed change.

Similarly, the right end and the left side of a second reduction gear shaft 65s are journaled between the gear covering member 26 and the wall face of the transmission case 23 via bearings 64 and 64, and a large-diameter gear 65a integrated with the second reduction gear shaft 65s engages with a small-diameter gear 63b integrated with the reduction gear shaft 63s.

On the other hand, a female threaded member 67 is fastened with a bolt 68 to a disk boss member 66 whose base end is supported by the outer ring of the bearing 52 fitted onto the crankshaft 40. A large-diameter gear 67a is formed on the flange part of the female threaded member 67, and the large-diameter gear 67a engages with a small-diameter gear 65b integrated with the second reduction gear shaft 65s.

A female thread (screw thread) is formed on the inner circumferential face of the cylindrical part 67s of this female threaded member 67.

A male threaded member 70 is supported via a bearing 69 fitted onto the outer circumference of the movable pulley hub 51dh capable of sliding in the axial direction to support the movable half pulley 51d. A male thread formed on the outer circumferential face of the cylindrical part 70s of the male threaded member 70, inside the cylindrical part 67s of the female threaded member 67, is screwed into the female thread of the inner circumferential face of the cylindrical part 67s.

The left end of the cylindrical part 70s of the male threaded member 70 is exposed leftwardly from the left opened end of the cylindrical part 67s of the female threaded member 67. A flange part 70a extends from this left end in the centrifugal direction along the rear face of the movable half pulley 51d.

An annular member 71 is fastened to the outer circumferential part of the flange part 70a of the male threaded member 70. The rear part of the annular member 71 extends rearwardly to stretch out to the right in the axial direction so as to go around the outside of the large-diameter gear 67a of the female threaded member 67. The extending part 71a is held between a pair of upper and lower guide pieces 72 and 72 projecting into the shift chamber 50C of the transmission case 23 to restrict the rotation of the extending part 71a and at the same time guide its movement in the axial direction (see FIG. 4).

Therefore, the male threaded member 70 supported by the movable pulley hub 51dh integrated with the movable half pulley 51d via the bearing 69 is restricted in rotation by the guide pieces 72 and 72, and can slide only in the axial direction.

The speed change drive mechanism 60 is configured as described above: when the driving gear 61a formed on the drive shaft 61s rotates, driven by the electric motor 61 for speed change, the large-diameter gear 63a of the first reduction gear shaft 63s engaging with the driving gear 61a rotates together with the small-diameter gear 63b at a reduced speed. The large-diameter gear 65a of the second reduction gear shaft 65s engaging with this small-diameter gear 63b rotates together with the small-diameter gear 65b at a further reduced speed. The large-diameter gear 67a of the female threaded member 67 engaging with this small-diameter gear 65b and rotates at still a further reduced speed to turn the female threaded member 67.

When the female threaded member 67 is turned, as the male threaded member 70 screwed into it is restricted in rotation, it is moved by the screw mechanism in the axial direction.

The movement of the male threaded member 70 in the axial direction causes the movable pulley hub 51dh via the bearing 69 to move integrated with the movable half pulley 51d in the axial direction, and can thereby bring the movable half pulley 51d toward or away from the fixed pulley half 51s.

In addition, the movable half pulley 51d, as the movable pulley hub 51dh integrally supporting it is spline-fitted to the guide sleeve 53 integrated with the crankshaft 40, moves in the axial direction while turning together with the crankshaft 40.

As the driving by the electric motor 61 for speed change turning forward or rearward brings the movable half pulley 51d toward or away from the fixed pulley half 51s in this way, the winding diameter of the V belt 58 wound between the opposing tapering faces of the half pulleys 51s and 51d is varied to accomplish continuous speed variation.

A bracket 26a, to which a revolution sensor 75, which is a rotary potentiometer, is to be fitted, is formed to project to the left on the gear covering member 26 to be fitted from the left side to the swell 23e of the transmission case 23. The revolution sensor 75, with its rotary operating shaft 75a somewhat inclined from the vertical direction, is fastened to the bracket 26a.

A worm wheel 75w fitted onto the lower part of the rotary operating shaft 75a engages with a worm gear 65w at the left end projecting to the left from the left side bearing 64 of the second reduction gear shaft 65s to constitute a worm gear mechanism.

Therefore, when the electric motor 61 for speed change drives the second reduction gear shaft 65s via the reduction gearing, the rotary operating shaft 75a is rotated via the worm gear mechanism and its number of revolutions is detected by the revolution sensor 75.

The number of revolutions detected by the revolution sensor 75 corresponds to the moving distance of the movable half pulley 51d in the axial direction, namely the variation in the winding diameter of the V belt 58 around the drive pulley 51.

Thus, the revolution sensor 75 detects the state of speed variation of the belt-driven continuously variable transmission 50.

In the crankcase 40C formed by the left crankcase part 23a and the right crankcase 22, a balancer 76 is provided above the crankshaft 40 slightly forward with two ends of the balancer shaft 76s being rotatably journaled via bearings 77 and 77. A balancer weight 76w is in a position overlapping in a side view between the pair of crank webs 40w and 40w (see FIG. 4).

Further, as shown in FIG. 2, the balancer 76 is in a position overlapping the large-diameter gear 65a and the small-diameter gear 65b of the second reduction gear shaft 65s in a side view.

In the crankcase 40C, adjoining the right side bearing 77, a balancer-driven gear 78b is fitted onto the balancer shaft 76. The balancer-driven gear 78b, adjoining the right side crank web 40w engages with a balancer-driving gear 78a fitted onto the crankshaft 40.

The balancer-driving gear 78a and the balancer-driven gear 78b are equal in diameter.

Therefore, the balancer 76, rotating at the same speed as and in the reverse direction to the crankshaft 40, reduces the primary vibration of the internal combustion engine 30.

Since the balancer-driven gear 78b, which is only slightly larger in diameter than the rotational locus of the balancer weight 76w, is arranged, together with the balancer 76, in a position overlapping the reduction gear mechanism of the speed change drive mechanism 60 (in particular the large-diameter gear 65a and the small-diameter gear 65b of the second reduction gear shaft 65s) in a side view, there is no need to have the crankcase 40C accommodating the balancer 76 and the balancer-driven gear 78b particularly swell outwardly. Thus, this construction facilitates making the power unit 20 to be a compact size.

A starter motor 120 is arranged, fitted to the right crankcase 22, behind and obliquely below the electric motor 61 for speed change which is fitted to the swell 23e of the transmission case part 23b from the right side.

The starter motor 120, like the electric motor 61 for speed change, is fitted, with the drive shaft 120s placed in a posture parallel to the right and left directions, from the left side to the left side face of a swell 22e directed slightly rearwardly on the right side of the right crankcase 22.

With reference to FIG. 3 which shows a right profile, a reduction gear shaft 121s is rotatably journaled between the drive shaft 120s and the crankshaft 40. A large-diameter gear 121a is integrated with the reduction gear shaft 121s and engages with a driving gear 120a formed on the drive shaft 120s.

On the other hand, a driven gear 122, adjoining the AC generator 42 disposed at the right end of the crankshaft 40, is fitted onto and supported by a rotary boss 123 rotatably journaled to the crankshaft 40 (see FIG. 4), and the driven gear 122 engages with a small-diameter gear 121b integrated with the reduction gear shaft 121s.

In addition, a unidirectional clutch 124 intervenes between an outer rotor 42r of the AC generator 42, and us integrated with the crankshaft 40 and the rotary boss 123.

Thus, when the driving gear 120a formed on the drive shaft 120s turns as driven by the starter motor 120, the large-diameter gear 121a of the reduction gear shaft 121s which engages with the driving gear 120a rotates at a reduced speed together with the small-diameter gear 121b. The driven gear 122, which engages with this small-diameter gear 121b, rotates at a further reduced speed together with the rotary boss 123. In addition, the rotation of the rotary boss 123 causes via the unidirectional clutch 124 the outer rotor 42r of the AC generator 42 to rotate together with the crankshaft 40 to enable the internal combustion engine 30 to be started.

Next, the structure of the rear part of the power unit 20 will be described.

Referring to FIG. 4, a driven pulley 81 corresponding to the drive pulley 51 of the belt-driven continuously variable transmission 50 includes a fixed pulley half 81s and a movable half pulley 81d, which oppose each other and are both supported by a driven shaft 82.

The driven shaft 82 is rotatably journaled to three positions including the transmission case 23, the transmission case cover 24 and the reduction gear cover 25 respectively via bearings 83, 84 and 85.

Referring to FIG. 4, a small-diameter part 82a somewhat shrunken in diameter from a step part is formed in the left side part of the driven shaft 82. A bearing 86, a supporting sleeve 87 and a collar 88 are fitted onto the small-diameter part 82a in this order, with a nut 89 being screwed on at an end to fasten them integrally together.

The bearing 84 intervenes between the bearing concave 24q of the transmission case cover 24 and the collar 88.

The base of a bowl-shaped clutch outer 91 of a centrifugal clutch 90 is fastened to the supporting sleeve 87 to rotate integrally together with the driven shaft 82.

A cylindrical fixed pulley hub 95 supporting the fixed pulley half 81s is journaled to the outer circumference of the part of the driven shaft 82 shielded by the transmission case cover 24 farther to the right than the clutch outer 91 to be enabled to rotate relative to the driven shaft 82 by the intervening presence of the bearing 86 and the bearing 96.

A supporting plate 92a, which is the clutch inner 92 of the centrifugal clutch 90, is fixed to the left end of this fixed pulley hub 95 with a nut 97.

The base end of an arm 92c is journaled to the supporting plate 92a by an axis 92b, and a clutch shoe 92d is fastened to the tip of the arm 92c.

The arm 92c is forced by a spring 92e to move the clutch shoe 92d in a direction away from the inner circumferential face of the clutch outer 91.

A cylindrical movable pulley hub 98 which supports the movable half pulley 81d is disposed slidably in the axial direction on the outer circumference of the cylindrical fixed pulley hub 95 supporting this clutch inner 92.

Thus, a long guide hole 98a is formed in the axial direction in the cylindrical movable pulley hub 98. A guide pin 99 projects from the fixed pulley hub 95 slidably engages with the guide hole 98a.

Therefore, the movable pulley hub 98 is restricted by the guide pin 99 in rotation relative to the fixed pulley hub 95, and at the same time can slide in the axial direction on the fixed pulley hub 95, guided by the guide hole 98a.

A coil spring 100 intervenes between the supporting plate 92a integrally fitted to the fixed pulley hub 95 and the movable pulley hub 98. The movable pulley hub 98 is forced to the right by the coil spring 100.

Because of the configuration described above, the movable half pulley 81d supported by the movable pulley hub 98 rotates together with the fixed pulley half 81s supported by the fixed pulley hub 95, is slidable in the axial direction, and is forced by the coil spring 100 in the direction to approach the fixed pulley half 81s.

The V belt 58 is wound between the opposing tapering faces of the fixed pulley half 81s and the movable pulley hub 98. The winding diameter of the driven pulley 81 varies interlocked in inverse proportion to the winding diameter on the drive pulley 51 side to accomplish continuous speed variation.

When the rotation of the drive pulley 51 surpasses a prescribed number of revolutions, the clutch shoe 92d of the clutch inner 92 of the centrifugal clutch 90 comes into contact with the inner circumferential face of the clutch outer 91 to transmit motive power to the driven shaft 82.

The reduction gear chamber 110C for accommodating the reduction gear mechanism 110 is configured, shielded by the reduction gear cover 25, on the rear right side of the transmission case 23.

As shown in FIG. 4, two ends of a reduction gear shaft 112s are journaled via bearings 111 and 111 between the rear part of the transmission case 23 and the reduction gear cover 25 which oppose each other. A large-diameter gear 112a is integrated with the reduction gear shaft 112s engages with a small-diameter gear 82g formed on the driven shaft 82.

Similarly, the rear wheel shaft 114 is rotatably journaled via bearings 113 and 113 between the rear part of the transmission case 23 and the reduction gear cover 25 with the rear wheel shaft 114 projecting to the right from the right side bearing 113. A large-diameter gear 114a is integrally fitted on to the rear wheel shaft 114 and engages with a small-diameter gear 112b integrated with the reduction gear shaft 112s.

A hub 17h of the rear wheel 17 is fitted onto a part projecting to the right from the reduction gear cover 25 of the rear wheel shaft 114.

Therefore, the rotation of the driven shaft 82 is reduced in speed via the reduction gear mechanism 110 and transmitted to the rear wheel shaft 114 to turn the rear wheel 17.

In the power transmission structure of the power unit 20 described above, the electric motor 61 for speed change of the speed change drive mechanism 60, which varies the speed of the belt-driven continuously variable transmission 50, is fitted to the upper part of the right side face of the upward swell 23e on the front part of the transmission case 23. The starter motor 120 is fitted to the left side face of the swell 22e of the right crankcase 22 behind and obliquely below the electric motor 61 for speed change.

Referring to FIG. 2 which shows a left side view, with respect to the pivot shaft 19 to which the power unit 20 is swayably journaled, the electric motor 61 for speed change and the starter motor 120 are arranged to be adjoining to each other similarly in the rear. The electric motor 61 for speed change is arranged in a higher position than the starter motor 120 which is at substantially the same height as the pivot shaft 19 and in a position closer to the pivot shaft 19 than the starter motor 120.

Therefore, as the electric motor 61 for speed change and the starter motor 120 are concentrated similarly in the rear with respect to the pivot shaft 19. Thus, the work of fitting the electric motor 61 for speed change and the starter motor 120 is simplified. At the same time the motor wiring is shortened to facilitate the wiring work.

It is further made possible to concentrate such heavy items as the electric motor 61 for speed change and the starter motor 120 near the pivot shaft 19 for reducing the inertia accompanying the oscillation of the power unit 20 and to alleviate the riding vibration.

In addition, while the electric motor 61 for speed change has the first reduction gear shaft 63s which substantially reduces speed and the heavy speed change drive mechanism 60 which is the two-stage reduction gear mechanism of the second reduction gear shaft 65s because the movable half pulley 51d has to be moved in the axial direction when the transmission belt 58 is tuned, which requires a greater torque than the starter motor 120 does, the arrangement of the electric motor 61 for speed change in the space between the pivot shaft 19 and the starter motor 120 enables this heavy speed change drive mechanism 60 arranged from the electric motor 61 for speed change to the movable half pulley 51d of the crankshaft 40 to be arranged between the pivot shaft 19 and the starter motor 120 in a side view as shown in FIG. 2, making a further contribution to the concentration of heavy items.

As the pivot shaft 19 which swayably journals the power unit 20 journals the power unit hangers 21h projecting from the front end of the unit case 21 (the transmission case 23) in front of the electric motor 61 for speed change, it is possible to have the vibration-suppressing function of the rear shock absorber 18 effectively exerted by setting a long enough distance between the rear shock absorber 18 intervening between the transmission case 23 and the main pipes 7 at the rear end of the case and the center of swaying (the pivot shaft 19).

As the electric motor 61 for speed change and the starter motor 120 are arranged in the upper front part of the unit case 21, the electric motor 61 for speed change and the starter motor 120 can be securely protected from water and mud to increase their durability. At the same time, the electric motor 61 for speed change and the starter motor 120 can be fitted from the upper part of the unit case 21 to make the assembling work easier and more reliable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit having a unit case journaled in a front part to a body via a pivot shaft oriented in the widthwise direction of the body and extending rearwardly to be swayable up and down relative to the body, wherein a belt-driven continuously variable transmission which achieves with an electric motor for transmission continuous speed variation by changing the winding diameter of the transmission belt of a drive pulley disposed together with an internal combustion engine started with a starter motor, comprising:

said electric motor for transmission and the starter motor together being supported by the unit case are arranged adjoining each other on the same side as the pivot shaft in a side view; and the electric motor for transmission is arranged in a position closer to the pivot shaft than the starter motor.

2. The power unit according to claim 1, wherein the pivot shaft is positioned in front of the electric motor for transmission.

3. The power unit according to claim 1, wherein a throttle body is arranged above the pivot shaft and close to the pivot shaft.

4. The power unit according to claim 2, wherein a throttle body is arranged above the pivot shaft and close to the pivot shaft.

5. The power unit according to claim 1, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

6. The power unit according to claim 2, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

7. The power unit according to claim 3, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

8. The power unit according to claim 4, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

9. A power unit comprising:

a unit case journaled in a front part to a body via a pivot shaft oriented in the widthwise direction of the body and extending rearwardly to be swayable up and down relative to the body;

a belt-driven continuously variable transmission which achieves with an electric motor for transmission continuous speed variation by changing the winding diameter of the transmission belt of a drive pulley disposed together with an internal combustion engine started with a starter motor;

said electric motor for transmission and the starter motor together being supported by the unit case are arranged adjoining each other on the same side as the pivot shaft in a side view; and the electric motor for transmission is arranged in a position closer to the pivot shaft relative to the starter motor.

10. The power unit according to claim 9, wherein the pivot shaft is positioned in front of the electric motor for transmission.

11. The power unit according to claim 9, wherein a throttle body is arranged above the pivot shaft and close to the pivot shaft.

12. The power unit according to claim 10, wherein a throttle body is arranged above the pivot shaft and close to the pivot shaft.

13. The power unit according to claim 9, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

14. The power unit according to claim 10, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

15. The power unit according to claim 11, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

16. The power unit according to claim 12, wherein: the internal combustion engine is provided with a balancer for rotation as the rotation of a crankshaft is transmitted to the balancer via a gear mechanism; and a balancer-driven gear rotating the balancer integrally is arranged in a position where it overlaps in a side view a reduction gear mechanism which transmits the motive power of the electric motor for transmission to the drive pulley of the belt-driven continuously variable transmission.

* * * * *